United States Patent
Keilin et al.

[11] 3,899,421
[45] Aug. 12, 1975

[54] SALT RECOVERY SYSTEM

[76] Inventors: Bertram Keilin, 9711 La Capilla Ave., Fountain Valley, Calif. 92708; Joseph M. Hebert, 336 N. Main St., Salinas, Calif. 93901

[22] Filed: Nov. 9, 1973

[21] Appl. No.: 414,400

[52] U.S. Cl. .................... 210/96; 210/104; 210/180
[51] Int. Cl. ............................................. B01d 15/06
[58] Field of Search .............. 210/96, 104, 180, 190

[56] References Cited
UNITED STATES PATENTS

| | | | |
|---|---|---|---|
| 2,209,487 | 7/1940 | Wagner | 210/96 X |
| 3,454,492 | 7/1969 | Gaines | 210/190 X |
| 3,531,402 | 9/1970 | Thompson | 210/96 X |

*Primary Examiner*—John Adee
*Attorney, Agent, or Firm*—John H. Crowe

[57] ABSTRACT

A salt recovery system for use with a conventional automatic water softener designed to pass hard water through a water softening resin, and having suitable controls for regenerating the resin with brine after it becomes exhausted. The regeneration of the resin involves backwashing, brining, rinsing, etc., steps, and passage of the effluent from each of these steps to a sewer through a drain line. The salt recovery system is made up of a conductivity cell having electrodes which are positioned in the drain line, an evaporator tank, a downpipe running from the drain line to the evaporator tank, a diverter valve at the top of the downpipe, a solenoid designed to open the diverter valve when actuated, a relay functionally interconnecting the conductivity cell and the solenoid, and a float-controlled immersion heater in the evaporator tank. the brining cycle effluent, which has a high salt concentration, reaches the conductivity cell, the cell energizes the relay which then causes actuation of the solenoid. The actuated solenoid opens the diverter valve and allows the brining cycle effluent to flow into the evaporator tank. When the liquid effluent reaches a predetermined level in the tank, the float-controlled heater comes on to supply heat for the evaporation of water therefrom. Eventually the liquid in the tank becomes saturated and salt precipitates for subsequent disposal.

6 Claims, 2 Drawing Figures

SALT RECOVERY SYSTEM

BACKGROUND OF THE INVENTION

This invention relates generally to means for selectively recovering solutions of high saline content from drain pipes through which such solutions intermittently flow, and more particularly to such means adapted primarily for use in the recovery of salt from the resin regeneration effluents of automatic water softeners of the ion exchange resin type.

The typical water softener of the ion exchange resin type comprises a mineral tank loaded with ion exchange resin beads, a brine tank loaded with an excess of salt to provide a saturated salt solution when water is added, a flow control module, and sufficient plumbing to direct the flow of water and/or brine through the various parts of the water softener as described below. When installed for use, the water softener is connected to a source of tap water, a service line through which softened water flows to use facilities and a drain line through which the aqueous effluents from a resin regeneration cycle of operations, soon to be described, flow to the sewer. All water softeners of the present type employ ion exchange resins with exchangeable sodium ions which change places with calcium and magnesium ions in hard water when the water is brought into contact with the resins, the water being softened by the consequent loss of its calcium and magnesium content. After a period of continued usage, the resin loses enough of its sodium to render it incapable of further water softening effectiveness, at which point it is said to be exhausted. Conventional automatic water softeners regenerate the exhausted resin by passing brine therethrough. In passing through the resin, the brine loses some of its sodium content, but a substantial amount of sodium remains in the brine effluent from such a regeneration operation.

Typically, flow control within an automatic water softener is effectuated by a flow control module, such as referred to above, which operates to permit the flow of tap water through the ion exchange resin in the mineral tank of the softener and into a service line until the ion exchange resin is exhausted, after which it initiates a sequence of consecutive flow steps designed to regenerate the resin and prepare the water softener for the resumption of normal service. These flow steps typically comprise, in the order in which they occur: (1) a backwash step in which tap water is passed through the ion exchange resin in the opposite direction to its normal direction of flow, and from there is passed to the sewer through the drain line; (2) a brining step in which brine is sucked from the brine tank into a venturi through which tap water is flowing, the resultant mixture of tap water and brine being passed through the ion exchange resin and then to the sewer through the drain line; (3) a slow rinse step in which tap water is passed through the ion exchange resin to rinse out residual brine from the brining step, the resulting effluent being passed to the sewer through the drain line; and (4) a brine refill and purging step in which inflowing tap water is passed partly into the brine tank, to replace the water removed in the brining step, and partly through the ion exchange resin to purge it of any traces of brine still remaining, the resulting effluent again being passed to the sewer through the drain line.

While the above sequence of flow steps is specifically illustrative of only one such sequence employed in automatic water softeners, it generally illustrates a flow pattern common to all such softeners, namely, a pattern of effluent flow through a drain line during a resin regeneration cycle of operations in which the character of the effluent changes abruptly from substantially salt-free, to substantially salty and then to almost salt-free. The substantially salty effluent is, of course, that from the brining step. At the present time, all of these effluents are sent to the sewer with the result that a considerable amount of salt thus goes to waste. If this salt could be recovered it could be reused to economic advantage. Furthermore, the recovery of salt would prevent the discharge of a waste material which might have a deleterious effect on the environment. No one has, however, at least to our knowledge, provided a satisfactory way of selectively recovering the salt now lost to the sewer in the brining step effluents of water softener resin regeneration operations.

SUMMARY OF THE INVENTION

We have now provided, in the salt recovery system of this invention, a means of selectively bleeding off the high salt content portion of the effluent passing through the drain line of an automatic water softener of the above-described type and collecting it for reuse or selective disposal, while permitting those portions of the effluent stream containing little or no salt to pass to waste. In its preferred form, our salt recovery system includes sensing means, for example, a conductivity cell, for the detection of high salt concentration in the effluent stream passing a given point adapted to actuate a diverter valve in the drain line to shunt the flow of high salt content effluent through a downpipe and into a collecting tank of some sort. Subsequently, when the high salt portion of the effluent stream passes out of contact with the sensing device, it ceases to have an actuating effect on the diverter valve, and the valve then closes and shuts off the flow of effluent into the collecting tank. Preferably, all of this is accomplished by means of circuitry containing the aforesaid conductivity cell, a relay, and a solenoid, the solenoid being positioned around an upstanding stem on the diverter valve in such fashion as to lift this stem, and thereby open the valve, when it is actuated, such actuation being accomplished as a result of current flow between the electrodes of the conductivity cell, which are installed in the drain line to permit such flow when high salt content effluent comes into contact with them. The conductivity cell is connected to a low voltage source of current and the relay, which relay serves, by appropriate circuitry, to actuate the solenoid from a source of standard 110–115 volt A.C. current when it is energized. The relay is, of course, energized only when current is flowing between the electrodes of the conductivity cell as a result of their contact with high saline content effluent in the drain line.

The collecting tank for the diverted salt solution is preferably, but not necessarily, an evaporator tank fitted with a float-actuated immersion heater. When the liquid in the tank reaches a predetermined level, it moves a float into position to close the heater circuit, and an immersed heater element comes on to heat this liquid. The heater supplies sufficient heat to evaporate water from the tank solution, which condenses on the inner surface of the top of the tank and runs down into a peripheral gutter around this top (which latter is domed to permit the condensate to flow into the gutter), from whence it is drawn, through an appropriate opening in the gutter, into the drain line. The solution in the tank becomes more and more concentrated in salt, as water is evaporated therefrom, so that it eventually becomes saturated, at which point salt begins to crystallize out. The salt crystals are allowed to accumulate, and are eventually removed from the tank for purposes of economic reuse or selective disposal.

The component parts of our salt recovery system are either standard off-the-shelf items, readily available from commercial sources at relatively low cost, or of such character that they can be easily made in quantity by appropriate fabricators at reasonable prices. All of these parts are of relatively simple construction, and can be readily installed in existing water softener systems at a cost favorable to the economics of their salt recovery function, or such as to enable compliance with local waste discharge regulations.

It is thus a principal object of this invention to provide economical and trouble-free means for recovering salt from the effluent liquids presently passed to the sewer during the resin regenerating cycles of conventional automatic water softeners.

It is another object of this invention to provide such salt recovery means of simple and inexpensive character which are easily installable in conventional water softener systems.

Other objects, features and advantages of the invention will become apparent in the light of subsequent disclosures herein.

DESCRIPTION OF THE PREFERRED EMBODIMENTS

Figure 1:
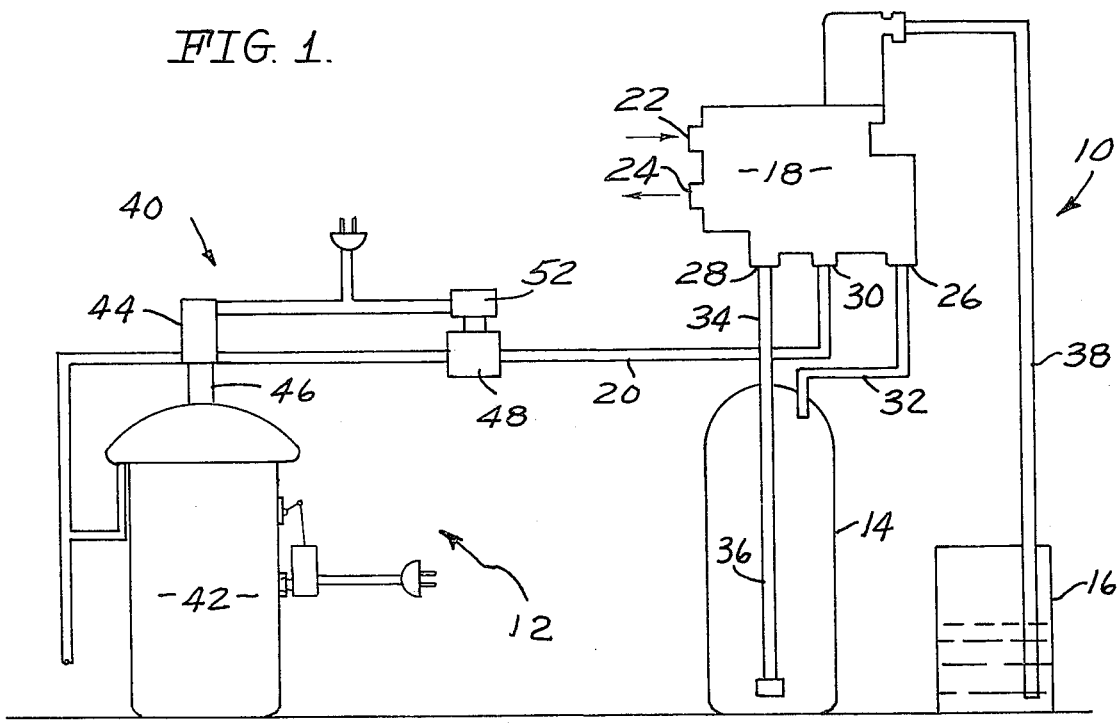
FIG. 1 is a schematic diagram of an automatic water softener of conventional type in combination with a salt recovery system of preferred type in accordance with this invention.

Considering now the drawings in greater detail, with emphasis first on FIG. 1, there is shown generally at 10 an automatic water softener of conventional type comprising a mineral tank 14 loaded with a water softening ion exchange resin (not shown), a brine tank 16 loaded with salt (not shown) and saturated brine, a flow control module 18 and appropriate plumbing for proper operation of the softener in the above-described manner. The flow control module 18 has a tap water inlet 22, to which a feed water line (not shown) can be attached, a soft water outlet 24, to which service line (not shown) can be attached for the passage of treated water from the softener to using facilities, a mineral tank outlet 26 from which a line 32 runs to connection with the mineral tank 14, and an inlet 28 to which a line 34, running from the mineral tank 14, is connected. Mineral tank 14 has a central pipe or tube 36 (actually an extension of line 34) extending downwardly from its top to a point near its bottom, and this is surrounded by the above-mentioned ion exchange resin. This ion exchange resin is typically in the form of "beads," and the bottom end of central tube 36 is provided with conventional means for preventing migration of the ion exchange beads into the tube.

The flow control module 18 has an internal cam and valve arrangement, not shown, controlled by a timer, not shown, and appropriate internal flow paths, by means of which water, and sometimes brine, is passed through the mineral tank in accordance with a prearranged flow sequence. The purpose of this arrangement is to permit the automatic flow of tap water through the mineral tank, for water softening purposes, until the ion exchange resin in the mineral tank becomes exhausted to the point at which it is no longer able to effectively perform its water softening function, and then automatically carry out a regeneration cycle of operations to regenerate the resin and prepare the mineral tank for a return to normal service. When the water softener is in service (between regeneration cycles), tap water enters the flow control module 18 at inlet 22 and is routed within the module to outlet 26, from whence it flows, through line 32, to mineral tank 14. Within the tank 14, the tap water filters downwardly through the ion exchange resin, and then passes upwardly through central tube 36, and again into flow control module 18 through the inlet 28. The water, now soft, is passed, within the module, to service outlet 24, and from there it flows, through said service line, not shown, to the using facilities (in a home or elsewhere) serviced by the softener.

After a predetermined period of normal service, typically between 1 and 6 days (logically a period, such as, for example, 1, 2 or 3 days, corresponding to the exhaustion cycle of the ion exchange resin), the timed camming mechanism within control module 18 activates valves which reverse the direction of flow of the incoming tap water through mineral tank 14, so that this water now flows downwardly through line 34 and the central tube 36 within the tank, and then upwardly through the ion exchange resin and back into the module through line 32, from whence it is passed into a drain line 20. This results in backwash of the resin, and will hereinafter be referred to as the backwash step of the resin regeneration cycle of flow operations between the periods of normal service of the water softener. This step is continued for a predetermined period, such as, for example, 45 minutes by the timed camming mechanism previously referred to but not shown. At the end of the predetermined period, the camming mechanism again changes the pattern of liquid flow through module 18, by operating appropriate valves permitting the flow of incoming tap water through a venturi designed and positioned to suck saturated brine from the brine tank through a line 38, and into the module. The tap water flowing through the venturi dilutes the brine to 40–60 percent of saturation, and the diluted brine is passed from the control module through line 32 to mineral tank 14, from whence it flows downwardly through the ion exchange resin and then upwardly through central tube 36, in the tank, and back into the module through line 34. From there the spent, diluted brine passes outwardly through drain outlet 30 and into drain line 20 to waste. Passage of the brine through the ion exchange resin results in a reverse exchange of sodium ions from the brine with calcium and magnesium ions on the resin, and regeneration of the resin for reuse. This step of the flow sequence will be hereinafter referred to as the brining, or regeneration, step. The spent brine from the brining step has given up some of its sodium, but still contains about half of the sodium chloride originally present, all of which goes to waste in conventional water softening procedures as presently practiced.

Following the brining step of the resin regeneration cycle of operations, tap water is passed through mineral tank 14 in the same direction of flow as that of the brine in said brining step for a predetermined period of time (this will hereinafter be referred to as the slow rinse step) and, finally, incoming tap water is passed partly into the brine tank, to replenish water removed during the brining step, and partly through the mineral tank to purge the ion exchange resin of any traces of salt remaining after the slow rinse step (this will be hereinafter referred to as the brine refill and purging step). In the slow rinse and brine refill and purging steps, as in the backwash and brining steps, the effluent from the mineral tank is passed into drain line 20. After completion of the brine refill and purging step, the regenerated ion exchange resin is again ready for normal water softening usage, and the timer controlled camming mechanism of control module 18 makes the necessary valve adjustments to direct the flow of tap water through mineral tank 14 and into the service line in the above-described fashion, for the predetermined period of service referred to above.

As will be apparent from the foregoing, the flow pattern of water softener 10 is such that there is no effluent flow through drain line 20 when the softener is in normal service, but during the resin regeneration cycle of operations there is a continuous flow of effluent through that line generated, in turn, by the backwash, brining, slow rinse and brine refill and purging steps of said cycle. Initially, during the backwash step, this effluent contains no salt. Then (with the beginning of the brining step), the effluent changes to a saline solution of relatively high concentration (typically about 11%), following which (at the beginning of the slow rinse step) the saline content of the effluent drops dramatically, and thereafter fades away, to substantially zero at the end of the brine refill and purging step.

The flow of control module 18 has been illustrated schematically, and described briefly, rather than in detail, herein, because such modules are wellknown components of conventional water softeners with which those skilled in the water softening art are thoroughly familiar, and additionally because it does not reside at the heart, or point of novelty, of the present invention. It should, of course, be understood that the design particulars, flow control patterns, and exact methods of functioning of flow control modules can vary from one commercially available unit to another. For example, with some modules the flow periods are predetermined and governed entirely by timers, whereas other modules employ sensing devices of various types to determined when it is necessary to regenerate water softening resins. Regardless of how the control module is constructed, or functions, however, the end result, insofar as the character of the regeneration cycle effluent streams from the softener are concerned, is substantially the same, by which is meant that these streams form a continuous outflow with consecutive segments varying in saline content from no or extremely low to relatively high saline content and the transition from no or low saline to high saline content in the outflow, and vice versa, is abrupt.

All of the water softener apparatus so far described is conventional, and forms, per se, no part of the present invention. As previously indicated, the main purpose of the invention is to provide simple, economical means for selectively recovering the salt normally lost in the high salt content portions of effluent streams passing through water softener drain lines such as drain line 20, and this is accomplished through the use of specialized sensing, bleeding and brine collecting facilities in conjunction with the drain line, a preferred combination of such facilities being illustrated, as a salt recovery system suitable for our purpose, at 40 in FIG. 1. The salt recovery system 40 comprises an evaporator tank 42, a downpipe 46 connecting drain line 20 with the evaporator tank, a solenoid-controlled diverter valve 44 positioned at the upper end of the downpipe 46 to open and close the pipe to the flow of effluent from the drain line, a conductivity cell 48 having a pair of electrodes positioned within drain line 20 upstream of the diverter valve, and the necessary electrical and plumbing fittings to permit operation of the system as described below.

Figure 2:
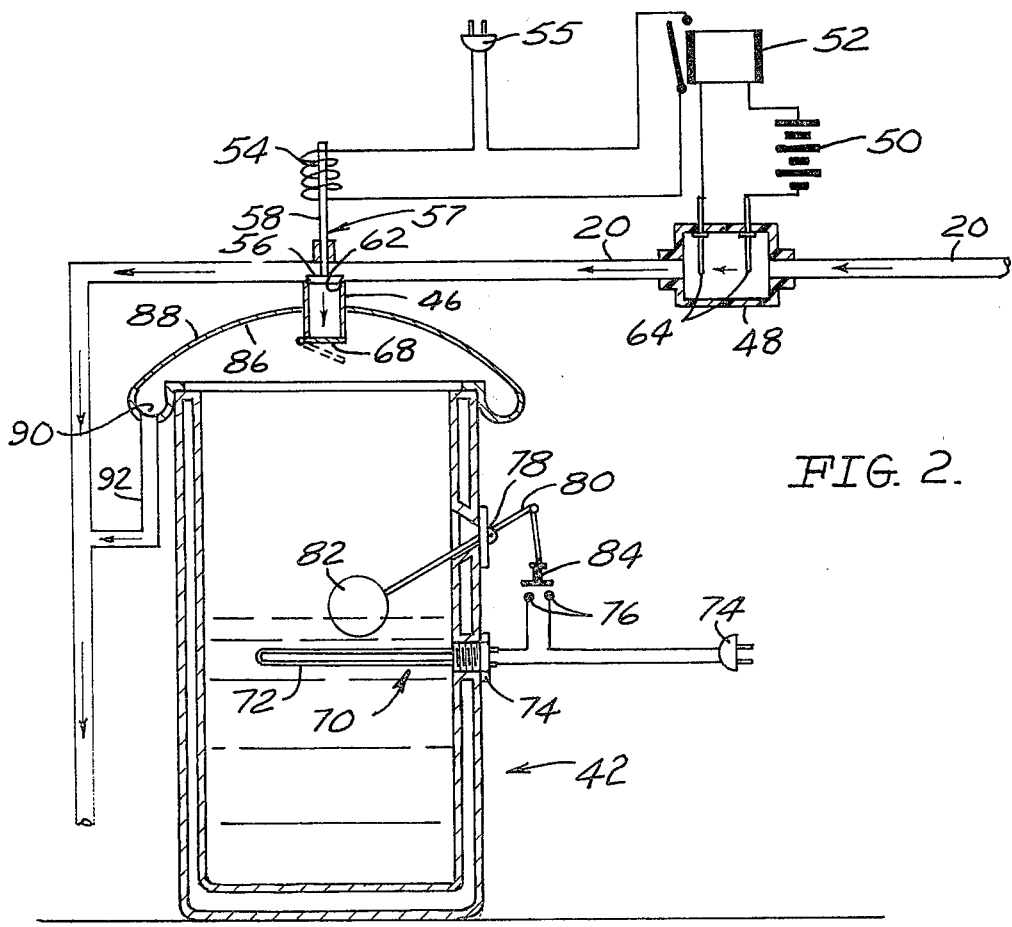
FIG. 2 is an enlarged view, partly schematic and partly in section, of the salt recovery system of FIG. 1.

Attention is now directed to FIG. 2, which illustrates salt recovery system 40 in greater detail than it is shown in FIG. 1. As that figure (FIG. 2) shows, the conductivity cell 48 draws low voltage current from a battery (e.g., a 6-volt battery) 50, and is connected in circuit with a relay 52. The relay activates a second circuit, including a solenoid 54 which draws current from a conventional 110-115 volt A.C. source by means of a plug 55, when it (the relay) is energized by the conductivity cell in the below-described manner. The solenoid-controlled diverter valve 44 includes solenoid 54 and a valve element 57 having a flattened plug 56 and an upstanding stem 58, the valve element being mounted in a seat 62 at the upper end of downpipe 46 and the solenoid having a receptive hollow for upstanding stem 58 and being positioned to receive said stem in said hollow, all as illustrated in FIG. 2. The solenoid and valve element 57 are designed to cooperate so that the solenoid, when energized, lifts the stem of the valve element to move the latter upwardly out of seat 62 and thereby open downpipe 46 for the flow of liquid from drain line 20 downwardly into evaporator tank 42. Solenoid 54 is energizing when effluent liquid flowing past the electrodes of conductivity cell 48 within drain line 20 (shown at 64 in FIG. 2) is high enough in salt content to conduct current of sufficient amperage for the purpose between the electrodes. This condition occurs when the high salt content effluent from the brining step of the water softener regeneration cycle contacts the electrodes. At such time, the low voltage current flowing through the conductivity cell circuit from battery 50 energizes relay 52, and the relay then acts as a switch to close the 110-115 volts solenoid circuit. This, in turn, causes solenoid 54 to lift the valve element 57 and open downpipe 46 to the flow of the high salt content liquid from the drain line. This liquid then flows downwardly into evaporator tank 42 until substantially all of the brining step effluent has passed electrodes 64 of conductivity cell 48. When the brining step effluent passes out of contact with the electrodes 64, the low salt content liquid (slow rinse step effluent) following in drain line 20 conducts substantially no current flow between the electrodes, with the result that the solenoid is deenergized and drops valve element 57 down into seat 62 to close off downpipe 46 to further liquid flow from drain line 20. It will thus be seen that conductivity cell 48 senses the saline content of effluent liquid in drain line 20 and effectuates the opening of diverter valve 44 in unison with the arrival of high salt content effluent thereat, then effectuates closing of the valve after this high salt content effluent has passed, to thereby bring about selective removal of the salty effluent from the drain line while permitting those portions of the effluent with low or no salt content to pass through the drain line into the sewer.

The downpipe 46 has a spring loaded check valve 68 at its bottom end, adapted to open under the pressure of downwardly flowing liquid from drain line 20, but remaining closed at other times. Evaporator tank 42 has double walls, separated by an air space, for thermal insulation purposes, preferably of heat-resistant metal (e.g., galvanized steel) construction, internally lined with a corrosion-resistant ceramic or equivalent, material. A single-walled tank with external insulation (again made of heat-resistant metal and having an internal lining of corrosion-resistant material) could be substituted for double-walled tank 42, if desired, within the scope of the invention. All such tank designs (double or single-walled) are well known to those skilled in the art.

Mounted part way up the side of evaporator tank 42 is an immersion heater 70 having an element 72 positioned to extend inwardly into the tank, as shown in FIG. 2 of the drawing. The heater operates on 110–115 volt A.C. current, which it obtains by means of a conventional plug 74, and it has a pair of switch terminals 76 in circuit with the element 72 for a purpose hereinafter appearing.

Pivotally mounted at 78 in the side of evaporator tank 42, near its upper end, is a lever arm 80 having a float 82 affixed to its inner end. Fixedly secured to the outer end of the lever arm 80 is a switch contact 84. As will now be apparent, float 82 moves up and down, within its limits of travel, on the surface of liquid within evaporator tank 42, after the liquid has risen to the float level, to bring switch contact 84 into bridging contact with the terminals 76 at a predetermined liquid level in the tank, and out of such contact when the liquid level drops below this level. When the switch terminals 76 are bridged by the contact 84 at said predetermined liquid level, heater 70 comes on to heat the liquid in the evaporator tank. The heater is designed to supply enough heat to bring about the evaporation of sufficient water from the liquid in evaporator tank 42 between resin regeneration cycles to prevent malfunctioning of the apparatus. Some pertinent data regarding the heat requirements of our salt recovery system when employed in typical household water softeners will be given below.

The evaporator tank 42 has a relatively thin, dome-shaped, friction-fit top 88. This top is of friction-fit character to permit easy access to the contents of the evaporator tank for a reason hereinafter appearing, and, similarly to the rest of the tank, is preferably of heat-resistant metal construction. The top, being relatively thin and, as will be noted from FIG. 2. of single thickness construction (rather than double thickness construction — with an air space between the thicknesses— as are the tank walls and bottom) is substantially lacking in heat insulation properties so that its inner surface, seen at 86, is at a temperature much closer to ambient temperature than are the insulated inner surfaces of the double thickness walls and bottom of the tank. The reason for this is to provide a cooling contact surface for water vapor evaporated within tank 42 by the heater 70. This vapor condenses on the cooler inner surface 86 of top 88 and, by virtue of the domed shape of the top, runs outwardly and downwardly toward its periphery. Around this periphery, the top is bent inwardly and upwardly to form a gutter 90 which receives the downwardly flowing condensate. Gutter 90 is fitted with a drain spout 92, which connects with the drain line 20, as shown, to carry the condensed water away from the evaporator tank toward the sewer.

The manner in which our salt recovery system functions to achieve the objects of this invention should now, it is believed, be clear. In brief summary, during the normal service operation of water softener 10, no liquid is flowing through drain line 20, and so there is nothing to conduct current between the electrodes of conductivity cell 48. At the beginning of the ion exchange resin regeneration cycle, liquid effluent from mineral tank 14 begins flowing through the drain line, the first portion of this liquid being salt-free effluent from the backwash step of said cycle. Following the backwash step, effluent from the brining step, which is relatively high in salt content, begins flowing through the drain line. When this high salt content effluent reaches the electrodes of conductivity cell 48, sufficient current flows therebetween to energize relay 50, which, in turn, causes energization of solenoid 54. Solenoid 54 then causes diverter valve 44 to open at about the same time the salty brining effluent reaches valve seat 62 at the top of downpipe 46. The brining effluent then flows downwardly through downpipe 46 and into the evaporator tank 42. Initially, this brining effluent rises in the tank until it reaches a high enough level to cause float 82 to close the heater switch (contact 84 and terminals 76) and thereby turn on the immersion heater 70. Heater 70 thereafter heats the liquid in the tank to evaporate water therefrom, which condenses on the inner surface of the domed top of the tank, runs down into gutter 90 around the edge of said top, and from there flows into drain spout 92 and to the sewer. After the brining step effluent has passed the conductivity cell electrodes in drain line 20, the relatively sharp drop in salt content between that effluent and the slow rinse step effluent following immediately thereafter results in substantial cessation of current flow between said electrodes and consequent deenergization of solenoid 54 and closure of diverter valve 44 to prevent entry of the low salt content slow rinse effluent into evaporator tank 42.

As more and more of the brining step effluent accumulates in evaporator tank 42, and more and more water is evaporated therefrom, the brine in the tank approaches, and finally reaches, a state of saturation, at which point salt crystals precipitate out. The salt crystals accumulate in the tank to a predetermined level, at which time the friction-fit top of the tank is taken off and the crystals are removed. After the crystals are removed, the top is replaced, and the evaporator tank is placed back into service. This cycle of brine accumulation, water evaporation and salt removal is repeated periodically for the continuous recovery of salt from water softener effluents which would otherwise go to waste.

Water softeners are available in different sizes and throughput capacities, and the novel evaporator tank of our invention can vary in size and holding capacity, depending upon the water softener system in which it is to be used. Many household, and other, water softeners typically generate about 6 gallons of saline (brining step) effluent with each resin regeneration cycle. Taking this as a standard for a typically representative water softener in common usage today, we have designed an evaporator tank of preferred dimensions and capacity for use with such a softener. This tank has an inside diameter of 1½ ft., a height of 4 ft. and a volumetric capacity of 7 cubic feet, or 52 gallons. The immersion heater for the tank is mounted at the 2½-foot, or 33-gallon, level, and the float at the 3-foot, or 39-gallon, level. Since the evaporator tank design is predicated upon the generation of 6 gallons of brining step effluent with each resin regeneration cycle, six such cycles will fill the tank to the 36-gallon level, which is just under the 2-foot mark. The seventh regeneration cycle brings the liquid to the 42-gallon level and results in tripping of the heater switch when the float is forced a short distance above its normal position at the 39-gallon level in the tank. When the heater comes on, water is evaporated as long as the float remains above about the 39-gallon level. When the liquid drops to about the 39-gallon level, the float switch, of course, opens, to shut off the heater.

During subsequent regeneration cycles, the liquid level within the evaporator tank fluctuates between about the 39-gallon and the 45-gallon, or the 3- and 3½-foot, levels, respectively. After the liquid becomes saturated in the evaporator tank, salt precipitates and is allowed to accumulate until it reaches the 2-foot level in the tank. This salt is then collected for economic reuse or selective disposal. At the 2-foot level, the salt occupies about 3 cubic feet of volume and weighs about 200 pounds. In addition to the crystallized salt, the evaporator tank will normally contain from 13 to 20 gallons of saturated spent brine effluent at the time of salt collection. The saline effluent from the brining step will normally contain about half a pound of NaCl and half a pound of $CaCl_2$ per gallon.

The conductivity cell 48 is a conventional instrument of a type well known to those skilled in the art, having two electrodes of a suitably conductive material spaced one centimeter apart within the drain line 20, each being one square centimeter in size. A few simple calculations will demonstrate why such a conductivity cell is effective for purposes of our invention. Assuming the brining step effluent from the regeneration cycle of water softener 10 contains half a pound of sodium chloride and half a pound of calcium chloride per gallon, and, assuming, further, that the conductivity of sodium chloride is equal to that of calcium chloride (this is valid within about 5%), then:

1 lb./gal. = 1 lb./7.48×1.08 = 1 lb./8.08 lb. = 11% solution
Conductivity = 0.13 mho/cm. (11%)
Conductivity of water = $4\times10^{-8}$ mho/cm.
Conductivity of 1,000 ppm saline = 0.001 mho/cm.
Resistance of 1,000 ppm saline = 1,000 ohms
Resistance of 11% saline = 8 ohms.

The conductivity cell experiences a surge of current between its electrodes when the 11% saline solution (brining step effluent) hits it, following the passage of essentially pure water from the backwash step through the drain line. When all of the brining step effluent has passed, the rinsing step effluent, having an almost negligible saline content, follows to substantially block the current flow between the electrodes. This, of course, causes deenergization of relay 52, and consequent closure of the diverter valve element 57.

The cost of operation of our novel salt recovery system resides mainly in the energy demands of immersion heater 70. Even when there is daily regeneration of the water softener resin, however, and this is more frequent regeneration than most household softeners require, the heater expense is relatively low. The following calculations, based on what are felt to be realistic efficiency and energy cost assumptions, bear this out:

For daily regeneration, need to evaporate 6 gallons in 24 hours, or 45 lbs./24 hours = 1.9 lbs./hr.
Requires 1.9 × 972 BTU/lb.
= 1850 BTU/hr.
= 0.5 BTU/sec.
= 520 watts Assume 50% efficiency for heat losses, use 1 kw heater.
Evaporates 0.25 gal./hr
At a household rate of 1.5 cents/kwh, the cost is 36 cents/day or 36 cents/regeneration.

While the novel salt recovery means of this invention has been herein described and illustrated in what we believe to be a preferred embodiment, it will be understood by those skilled in the art that various departures may be made therefrom within the scope of the invention. Certain of these departures have already been mentioned, and others will occur to those skilled in the art in the light of present teachings. For example, the flow control module 18 can be modified to operate diverter valve 44 on a time basis in coordination with the flow of regeneration cycle effluents through drain line 20 so that the diverter valve opens after sufficient time has elapsed to permit the backwash step effluent to pass, and closes after the proper interval of time for passage of the brining step effluent. Where this means of controlling the diverter valve is employed, there is, of course, no need for a conductivity cell sensing circuit, such as shown in the drawing, in our salt recovery system and that circuit is therefore omitted. A float mechanism can be employed in lieu of the conductivity cell for control of the diverter valve in still another modification of the salt recovery system of this invention. In this modification, the float mechanism is designed to sense the difference in specific gravity between highly saline solutions (1.05 – 1.20) and fresh water (1.00), and activate the diverter valve accordingly. Thus, the arrival of highly saline solution at the sensing point would cause a float to rise and open the valve to divert the flow of the solution into the evaporator tank.

In another example of a permissible variation of the preferred embodiment of our invention, the evaporator tank is provided with a side vent having a removable cap or plug through which precipitated salt can be removed. A tank with a side vent of this type need not have a friction-fit top, such as that of evaporator tank 42, although it could, if desired, have such a top to render its interior more easily accessible for cleaning or repair purposes.

In an alternative form of salt recovery system in accordance with this invention, a simple brine storage tank can be substituted for evaporator tank 42. This alternative system includes means for selectively diverting the brining step effluent from drain line 20 into the storage tank similarly to the way that effluent is diverted into evaporator tank 42 in salt recovery system 40, but, unlike evaporator 42, the storage tank has no heater for evaporating water from the diverted brine.

To compensate for this lack, however, saturated (rather than venturi-diluted) brine is used in the brining step of the resin regeneration cycle of water softener flow operations. This innovation in brine usage results in a brining step effluent of much higher salt content (and smaller volume) than that of a conventional water softener, and is highly desirable for most effective utilization of the alternative salt recovery system to minimize the size of the brine storage tank required in that system. A submersible chemical metering pump could be incorporated in the water softener system to pump the saturated brine directly from the brine tank into the mineral tank. The water softener would, of course, have to be modified in appropriate fashion for use in conjunction with this alternative form of salt recovery system, but such modification would, in the light of present teachings, pose no insurmountable problems to those skilled in the art. Where said alternative form of salt recovery system is employed, there is no precipitation of salt crystals for recovery, the high saline content brining effluent being merely permitted to accumulate in the brine storage tank until it is ready for removal and appropriate disposition.

The term "saline" has been generally employed herein to denote only sodium chloride (NaCl) salt. On at least one occasion, however, it has been loosely used to include calcium chloride, as well as sodium chloride, salt. To avoid any confusion in the claim language as a result of this, we wish to make it clear that "saline" is intended where it appears in the claims, to refer only to sodium chloride.

Consistently throughout this specification, we have referred to the ion exchange material in water softeners as an ion exchange or water softening resin. We wish to make it clear, however, that our invention is not limited to use with ion exchange resins, but can be employed with any suitable ion exchange material, such as, for example, any naturally occurring mineral having the necessary ion exchange properties. Likewise, although we have herein stressed the applicability of our invention for use in automatic water softener systems, the invention is not limited to such usage and can be employed in any water softener system, automatically controlled or otherwise (e.g., manually controlled), characterized by a pattern of effluent streams amenable to salt recovery treatment in accordance with present teachings.

In summary, the scope of the present invention extends to all variant forms thereof encompassed by the language of the following claims.

I claim:

1. In an automatic water softener comprising a mineral tank adapted to hold a quantity of water softening ion exchange material, a brine tank adapted to hold a supply of brine, flow control means, a drain line, and plumbing means interconnecting the mineral tank, brine tank and flow control means with a source of tap water, a service line for receiving softened water from the water softener, and said drain line, said flow control means being a flow control module;

said flow control module including associated valve and first valve control means for effectuating at least the following sequence of flow steps, in the order given: a service step in which hard tap water is passed through water softening ion exchange material in the mineral tank in a first direction to soften the water, the softened water then being passed into said service line; a backwash step in which new tap water is passed through the ion exchange material in the mineral tank in a second direction, opposite to the first, and then directed, as a substantially salt-free effluent, into said drain line; a brining step in which brine from the brine tank is passed through said ion exchange material for regeneration purposes, then, as a relatively high saline content effluent, into said drain line; and a rinse step in which fresh tap water is passed through said ion exchange material to rinse residual brine therefrom, and then into the drain line as a relatively low saline content effluent;

the saline recovery means comprising:

container means adapted to hold a quantity of liquid;

conduit means connecting said container means with said drain line;

valve means associated with said conduit means, said valve means being adjustable between an open position in which it permits the flow of liquid from said drain line through said conduit means and into said container means by gravity, and a closed position in which it blocks the flow of liquid through the conduit means into the container means, said valve means being in normally closed position; and second valve control means for opening said valve means at the approximate time the brining step effluent reaches said valve means and holding the valve means open until approximately all of this effluent flows into said conduit means, then causing said valve means to close, said second valve control means including sensing and valve opening means for sensing when the saline content of the effluent liquid in said drain line is relatively high, as in said brining step effluent, and then opening said valve means, holding it open for as long as the effluent remains relatively high in saline content, and, when the saline content in the effluent drops to the low level of the saline content of the rinse step effluent, causing said valve means to return to its normally closed position; whereby said valve means remains closed at all times except when the relatively high saline content effluent from said brining step reaches it, at which time it opens and remains open long enough to permit the flow of the effluent into said container means then closes again, to thereby effectuate selective recovery of the brining step effluent from the various flow step effluents passing through said drain line;

said sensing and valve opening means comprising a conductivity cell with a pair of electrodes, said cell being situated so that the electrodes are positioned in said drain line, a solenoid, and associated circuitry; said valve means comprising a diverter valve with an obturating element characterized and positioned for vertical movement, for valve opening purposes, by said solenoid when the solenoid is appropriately energized;

the conductivity cell, solenoid, associated circuitry and diverter valve being adapted and relatively positioned for cooperation so that contact of the conductivity cell electrodes by the brining step effluent in the drain line causes current flow therebetween because of the saline content of this effluent and the resulting current flow causes energization of said solenoid and consequent vertical movement of said obturating element of the diverter valve to its valve-open position, whereby the brining step effluent flows through the open valve and into said container means;

said current flow between said electrodes ceasing when the brining step effluent ceases to contact them so that said solenoid is deenergized to return said obturating element to its normal, valve-closed position and thereby shut off the continued flow of liquid from the drain line through said diverter valve.

2. Saline recovery means in an automatic water softener in accordance with claim 1, in which said container means comprises a tank adapted to receive the brining effluent diverted from said drain line by said diverter valve and having associated water removal means for removing water from said brining effluent in said tank so that the latter does not substantially exceed a maximum liquid level therein, whereby said brining effluent gradually reaches a point at which it becomes saturated in salt, after which salt precipitates as additional brining effluent enters the tank, which salt accumulates in the tank for subsequent removal and disposal.

3. Saline recovery means in an automatic water softener in accordance with claim 2 in which said water removal means comprises a float-controlled immersion heater having a heating element mounted in the wall of said tank, a lever mounted pivotally in the wall of the tank to extend through said wall, a float affixed to the inner end of said lever, and an electric heater switch movable between open and closed positions by the outer end of the pivotally mounted lever;

the heating element and electric heater switch being connected in circuit with an appropriate source of power and the position of said heating element, lever and float being such that the float causes the lever to close the switch, and thereby energize the heating element so that it supplies heat to the liquid in said tank for evaporation of water therefrom, when said liquid reaches a predetermined level above that of the heating element in said tank, and, conversely, causes the lever to open the switch when the liquid drops below said predetermined level;

whereby a relatively constant liquid level is maintained in the tank through intermittent evaporation of water from the accumulated brining step effluent therein as the float turns the heating element on and off with the rise and fall of the liquid past said predetermined level in said tank.

4. Saline recovery means in an automatic water softener in accordance with claim 3, in which said evaporator tank has a domed top with an inner surface substantially uninsulated from the ambient air that serves as a condensing surface for water vapor generated in the tank by said heating element, and said domed top terminates in a gutter around its lower periphery positioned to receive condensed water from said condensing surface to permit removal of the water from the tank.

5. Saline recovery means in an automatic water softener in accordance with claim 4, in which said gutter has a drain joined to said drain line to carry condensed water running thereinto from the condensing surface of said domed top away from the tank.

6. Saline recovery means in an automatic water softener in accordance with claim 5 in which said domed top is friction-fitted in place on said tank to permit its temporary removal for the recovery of precipitated salt from the tank.

* * * * *